(12) United States Patent
Gallagher

(10) Patent No.: US 11,644,691 B2
(45) Date of Patent: May 9, 2023

(54) MOUNTING FOR DECORATIVE ITEM TO EYEGLASSES

(71) Applicant: Moira K Gallagher, Addison, TX (US)

(72) Inventor: Moira K Gallagher, Addison, TX (US)

(*) Notice: Subject to any disclaimer, the term of this patent is extended or adjusted under 35 U.S.C. 154(b) by 200 days.

(21) Appl. No.: 17/326,607

(22) Filed: May 21, 2021

(65) Prior Publication Data
US 2022/0373826 A1    Nov. 24, 2022

(51) Int. Cl.
G02C 11/02    (2006.01)
A44C 17/02    (2006.01)

(52) U.S. Cl.
CPC .............. G02C 11/02 (2013.01); A44C 17/02 (2013.01)

(58) Field of Classification Search
CPC ................................ G02C 11/02; A44C 17/02
USPC ....................................... 351/41, 51
See application file for complete search history.

(56) References Cited

U.S. PATENT DOCUMENTS

| | | |
|---|---|---|
| 2,435,971 A | 10/1944 | Ludel |
| 2,766,541 A | 10/1956 | Quinones et al. |
| 2,778,136 A | 1/1957 | Belgard |
| 2,960,787 A | 11/1960 | Quinones et al. |
| 3,582,192 A | 6/1971 | Gitlin |
| 3,693,495 A | 11/1972 | Wagner |
| 4,794,766 A | 1/1989 | Schunk et al. |
| 4,806,008 A | 2/1989 | Tarloff |
| 4,968,128 A | 11/1990 | Mendola |
| 5,161,234 A | 11/1992 | Nitta |
| 5,185,620 A | 2/1993 | Cooper |
| 5,360,639 A | 11/1994 | Kawabata |
| 5,583,584 A | 12/1996 | Friedman |
| 5,912,718 A | 6/1999 | Murai et al. |
| 6,863,394 B1 | 3/2005 | Nelson et al. |
| 7,588,331 B2 * | 9/2009 | Burnstein .............. G02C 11/02 351/52 |
| 7,617,576 B2 | 11/2009 | Tanio |
| 7,901,070 B2 * | 3/2011 | Burnstein .............. G02C 11/02 351/52 |
| 8,955,355 B1 | 2/2015 | Dumas |
| 9,684,189 B2 * | 6/2017 | Guerrero .................. A44B 1/30 |

(Continued)

FOREIGN PATENT DOCUMENTS

WO    9633633    10/1996

OTHER PUBLICATIONS

BodyJewelryOnline; "Body Jewelry Online Nose Screw with Purpol Cz Jewel 18g", retrieved on Feb. 26, 2021 from http://www.amazon.com.

(Continued)

Primary Examiner — Tuyen Tra
(74) Attorney, Agent, or Firm — Robert H. Frantz

(57) ABSTRACT

A device for attaching a jewel or ornament to a hinge of a pair of eyeglasses having a threaded shank portion compatible with an eyeglass hinge threaded hole, a crown disposed at a top end of the threaded shank portion, and a drive tool receiver, such as a slot or crosspoint, disposed at the bottom end of the threaded shank portion. The device is installed into a threaded hole in a hinge by turning it with a tool which is inserted into the bottom of the hinge and rotating in an opposite direction of normal screw installation, thereby leaving the crown portion at the top of the screw available to hold a jewel or ornament while avoiding placing possible damaging torque and force on the jewel or ornament.

20 Claims, 5 Drawing Sheets

(56) References Cited

U.S. PATENT DOCUMENTS

| | | | |
|---|---|---|---|
| 9,888,749 B1 | 2/2018 | Kawakami | |
| 10,268,054 B2* | 4/2019 | Lachambre | G02C 11/02 |
| 2008/0209943 A1 | 11/2008 | Mattar | |
| 2009/0007598 A1 | 1/2009 | Lei | |
| 2010/0147025 A1 | 6/2010 | Simpson et al. | |
| 2012/0240623 A1 | 11/2012 | Morse | |
| 2014/0230187 A1* | 8/2014 | Philbin | G02C 11/02 |
| | | | 16/228 |

OTHER PUBLICATIONS

Esslinger; "Eyeglass screw refills"; retrieved on Feb. 26, 2021 from https://www.esslinger.com.

Esslinger; "Watch Repair Parts Jeweled Combination Watch Crown Refills"; retrieved on Feb. 26, 2021 from https://www.esslinger.com.

The Beading Gem; Post Earrings as Emergency Eyeglass Screw; retrieved on Feb. 26, 2021 from https://www.beadinggem.com.

Grainger; "Acorn, Hex Head Set Screw, Pk 10"; retrieved on Feb. 26, 2021 from https://www.grainger.com.

Urban Treasure; "Parker '51' Jewel and Bushing Screw"; retrieved on Feb. 26, 2021 from https://www.etsy.com.

Miami Star; "Cr. Dash Screw w/Green Jewel fits Mack"; retrieved on Feb. 26, 2021 from https://www.miamistar.com.

Northern Precision Ltd; "Self-clinching Flush Head Studs for Stainless Steel"; retrieved on Feb. 26, 2021 from https://www.npfasteners.com.

Prism Jewel Corp.; "1/5 Ctw Round Bezel-set Blue Color Diamond Solitaire Stud Earrings for Women"; retrieved on Feb. 26, 2021 from https://www.overstock.com.

Body Jewelry Online; "Belly Button Ring with CZ Jewell"; retrieved on Feb. 26, 2021 from https://www.walmart.com.

If It's Hip It's Here; "Shades of Modem Luxury: Gold & Wood Eyewear"; retrieved on Feb. 26, 2021 from https://www.ifitshipitshere.blogspot.com.

Iowa 80; "Peterbilt Large Black Jewel Dash Screws 14 Pk"; retrieved on Feb. 26, 2021 from https://www.iowa80.com.

* cited by examiner

MOUNTING FOR DECORATIVE ITEM TO EYEGLASSES

FIELD OF THE INVENTION

This invention relates to devices, systems and methods to attach or mount a decorative item, such as a jewel, to a pair of eyeglasses.

BACKGROUND OF INVENTION

According to the Vision Council, an industry association for manufacturers, distributors and marketers of eyewear, about 64% of adults wear eyeglasses, which is about 164 million American adults. Additional adults wear non-prescription eyewear, such as sunglasses and fashion glasses.

SUMMARY OF THE EXEMPLARY

Embodiments of the Invention

A device is disclosed for attaching a jewel or ornament to a hinge of a pair of eyeglasses having a threaded shank portion compatible with an eyeglass hinge threaded hole, a crown disposed at a top end of the threaded shank portion, and a drive tool receiver, such as a slot or crosspoint, disposed at the bottom end of the threaded shank portion. The device is installed into a threaded hole in a hinge by turning it with a tool which is inserted into the bottom of the hinge and rotating in an opposite direction of normal screw installation, thereby leaving the crown portion at the top of the screw available to hold a jewel or ornament while avoiding placing possible damaging torque and force on the jewel or ornament.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF ONE OR MORE EXEMPLARY EMBODIMENT(S) OF THE INVENTION

The present inventor has recognized that there is an unsatisfied need in the art of eyeglasses, both prescription and non-prescription, to be able to easily add decorative items to eyeglasses to personalize them for aesthetic appeal. There is a further need in the art to enable consumers to upgrade or refresh the appearance of older eyeglasses to avoid or delay substantial costs of purchasing new eyeglasses. There is a further need in the art for this consumer-level decorative upgrade device or system to be non-permanent and removable without damaging the eyeglasses themselves. The present inventor has recognized these unsatisfied needs, and presents the following disclosure of one or more embodiments according to the present invention. The embodiments are provided for illustrative purposes, and do not define the limits of the present invention, whereas other embodiments of the present invention are within the skill in the art to make and use.

Figure 1:
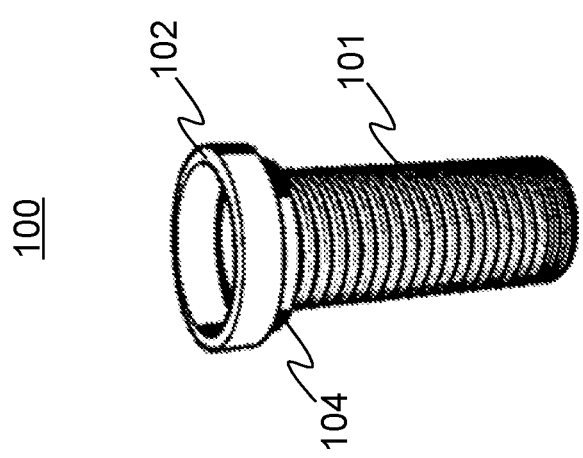
FIG. 1 provides a perspective view of an example embodiment according to the present invention.

Turning now to FIG. 1, one particular embodiment 100 according to the present invention is shown for a replacement eyeglasses hinge screw which has a threaded shank portion 101 that is compatible with a particular hinge design. There are a variety of hinge designs employing various lengths, diameters and thread pitches, so it is contemplated that various embodiments of the present invention may be manufactured to be useful for a wide variety of eyeglasses hinges presently on the market and in use by consumers.

The top of this embodiment omits or avoids providing a typical screw head with a slot, cross-point (a.k.a. "Phillips"), hex, Allen, Torx, or other cavity for receiving a drive tool such as a screwdriver. Instead, this embodiment includes at the top of the screw a new crown 102 for receiving a decorative item, such as a jewel, bauble or ornament, such as but not limited to synthetic gem stones, real gem stones, team logos, initials, zodiac symbols, political symbols, and religious symbols. The new crown may comprise, in some embodiments, a solid planar surface, while in other embodiments, the new crown may comprise a recess on a top surface for receiving a portion of a jewel, bauble or ornament, as shown in FIG. 1. Further, in this exemplary embodiment an optional shoulder 104 may be provided around the circumference of the top of the threaded shank portion 101 and below the crown 102 to serve as a spacer which lifts the received jewel or crown above the top edge of a temple piece of a pair of eyeglasses whereas many eyeglass hinges are recessed below the top edge of the temples (more details will be provided in the following paragraphs).

While FIG. 1 illustrates the one or more components of the example embodiment 100 as being separate, in other embodiments, some components may be formed integrally with each other.

Figure 2:
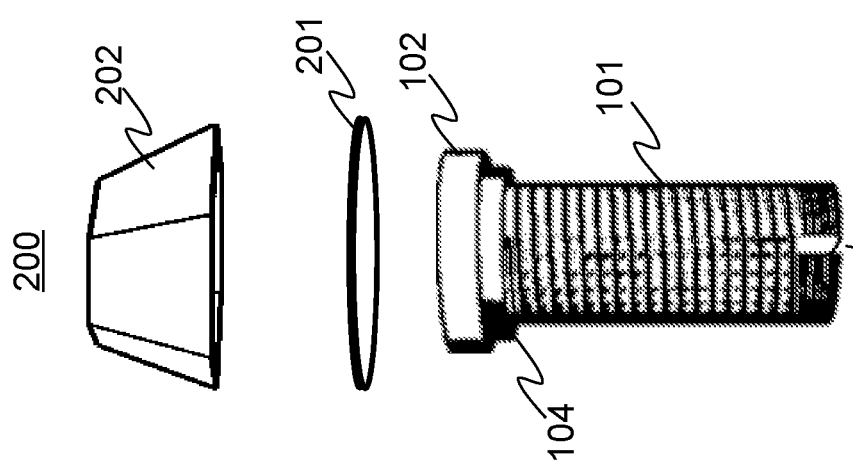
FIG. 2 provides an example exploded assembly according to the present invention.

Referring now to FIG. 2, at the bottom end of the threaded shank 101, opposite of the top end with the crown 102, a new drive tool receiver 103 is provided or formed, the simplest which is a slot formed through the diameter of the threaded shank, suitable for receiving a flat blade of a jeweler's screwdriver. Unlike typical screws, this slot (or other drive tool receiver shape) is not provided with a head surrounding the receiver, whereas this bottom portion of the threaded shank will be received into a threaded hinge of a pair of eyeglasses in place of a standard hinge screw. Other shapes of drive tool receivers may be employed in other embodiments, such as recesses or voids for any screwdriver tool (hex, crosspoint, Torx, etc.) or embossed shapes (raised portions) which can engage with sockets and the like.

Figure 3:
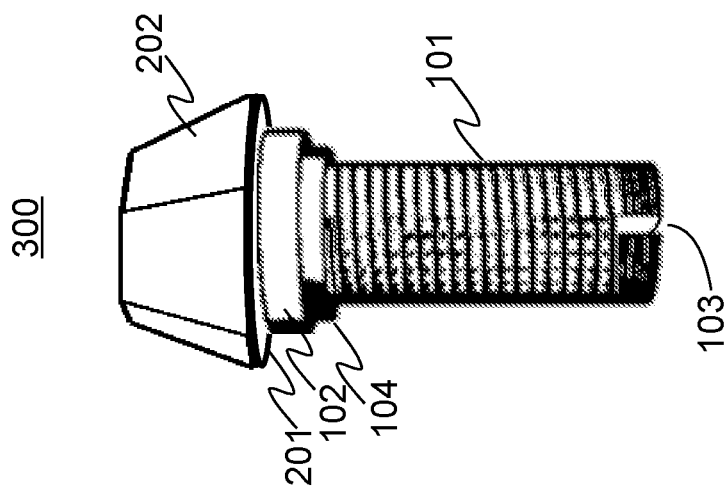
FIG. 3 illustrates an example completed assembly according to the present invention.

Also in FIG. 2, one example assembly embodiment 200 is shown in which a flat disc 201 is received on top of the crown, thereby providing a flat surface for receiving a flat bottom surface of a jewel or ornament 202. All three components may be attached together by snapping, friction fit (press fit), glue, magnets, welding, soldering, or any other suitable permanent or semi-permanent methods and materials. A completed assembly 300 is shown in FIG. 3.

And, as stated relative to FIG. 1, the separately-shown components of FIG. 2 can be formed, in some embodiments, integral to each other rather than assembling the embodiment 200 from two or more individual components to yield the final device 300.

Figure 5:
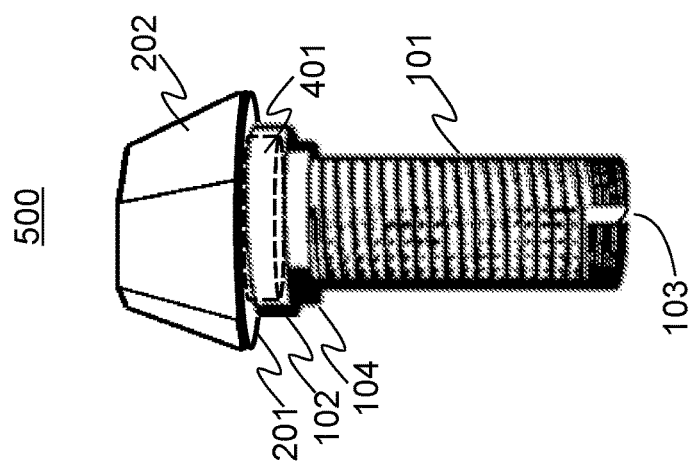
FIG. 5 illustrates another example completed assembly according to the present invention.
Figure 4:
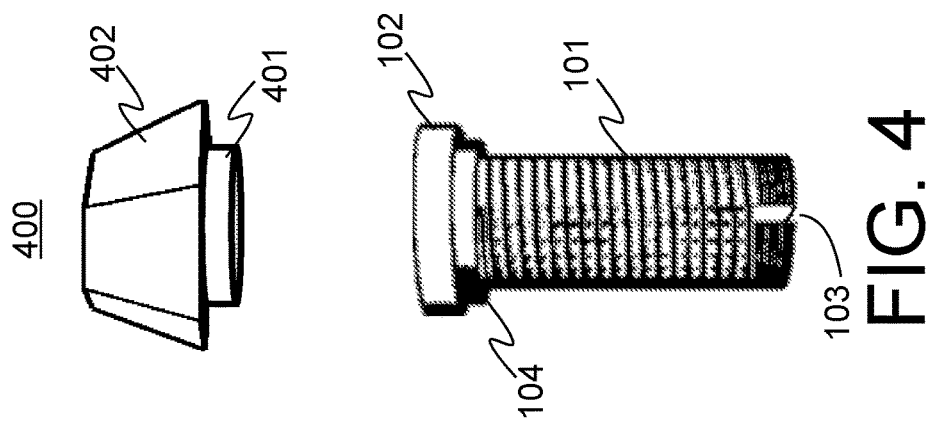
FIG. 4 provides another example exploded assembly according to the present invention.

In another available embodiment 400, as shown in FIG. 4, a jewel or ornament 402 may be provided with a boss portion 401 which mates with the recess of the crown 102, and may be retained or affixed there by snapping, friction fit (press fit), glue, magnets, welding, soldering, or any other suitable permanent or semi-permanent methods and materials. The boss portion 401 may be formed integrally with the jewel 402, or it may be a separate piece which is itself attached to the jewel 407 by snapping, friction fit (press fit), glue, magnets, welding, soldering, or any other suitable permanent or semi-permanent methods and materials. This yields an assembly 500 as shown in FIG. 5 wherein the boss portion 401 is hidden from view (shown in dashed lines), nearly identical to the assembly 300 of FIG. 3.

Figure 6:
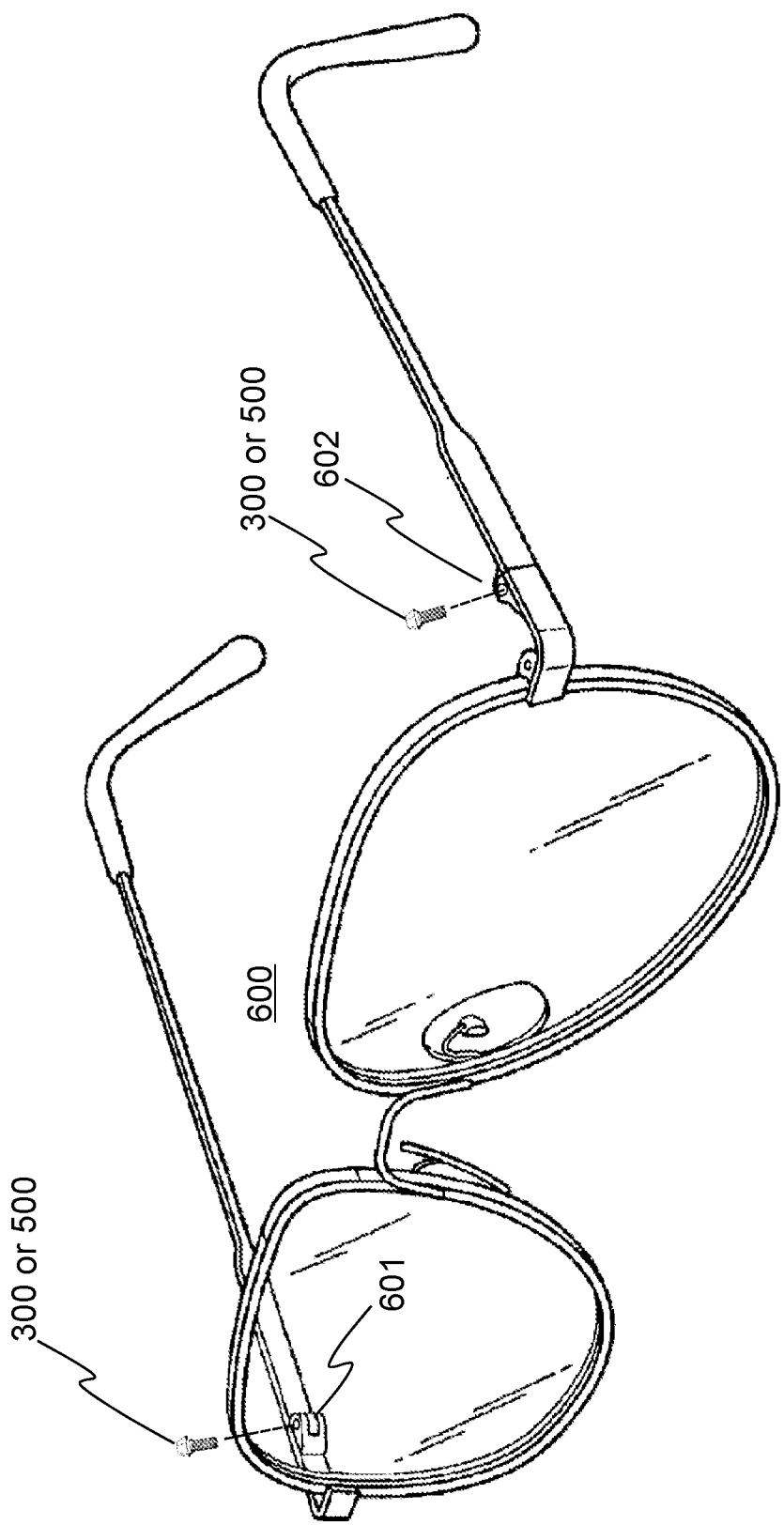
FIG. 6 sets forth a first phase in a manner of use of an example embodiment of the present invention.

Referring now to FIG. 6, a typical representative pair of eyeglasses 600 is shown having two hinges 601, 602 disposed between the left and right temples and the lens-carrying frame. To attach the jewel or ornament to the eyeglasses, the existing hinge screws are removed (if present) using the normal method of engaging the top of the screws with a drive tool and rotating the screws counter-clockwise when viewed from the top. Then, one at a time, the jewel or ornament attachment device 300 (or 500) is aligned for insertion into the threaded hole of the hinges.

Figure 7:
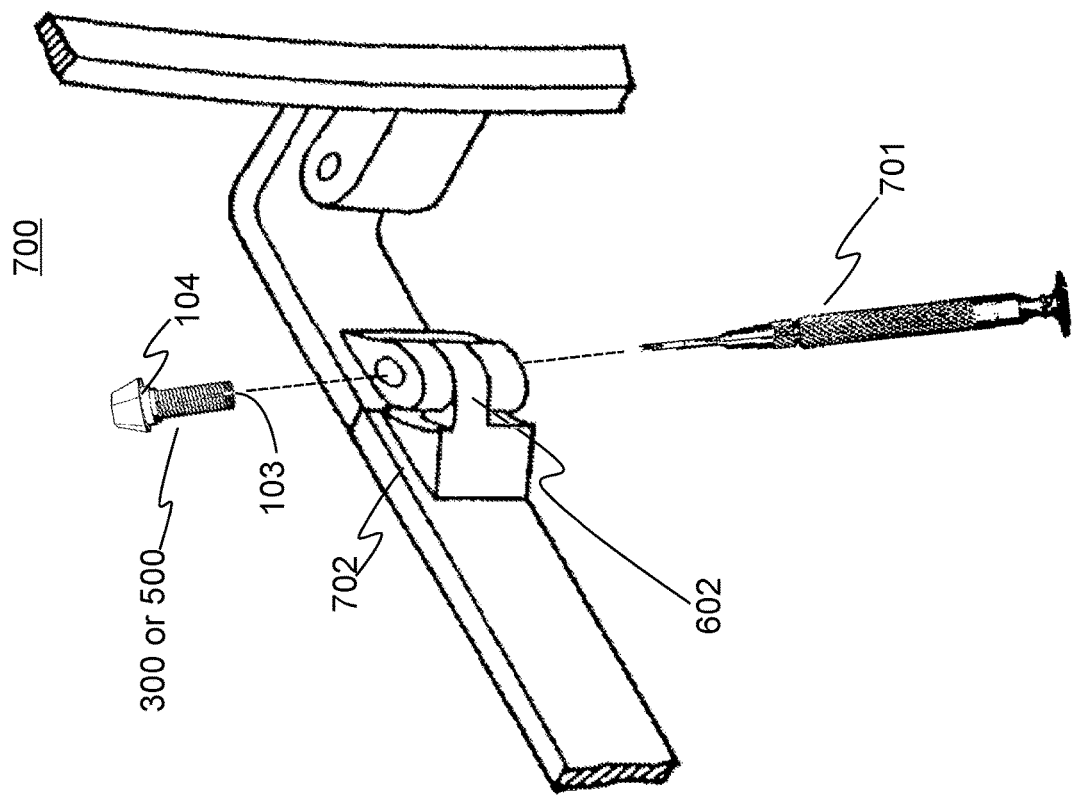
FIG. 7 sets forth a second phase in a manner of use of an example embodiment of the present invention.

However, the insertion process differs from the typical replacement screw process, as illustrated 700 in FIG. 7. The thin bit of a drive tool, such as a jeweler's flat blade screwdriver, is inserted into the bottom of the threaded hole in the hinge, and pushed through the hinge hole until it engages the driver receiver 103 in the bottom of the device 300 or 500. As the user presses lightly on the top of the device 300 or 500 to gently urge the device into the hinge hole, the user also turns the drive tool counter-clockwise, which is the opposite direction to install a typical screw from the top of the screw. In this way, putting significant force on the jewel or ornament to rotate the mounting device is avoided, thereby protecting the jewel or ornament from possible damage from crushing, squeezing, scratching or torque forces. During the reverse rotational process, the drive tool provides the rotational force to pull the device 300 or 500 into the threaded hole of the hinge and to tighten it to prevent it's backing out.

Figure 8:
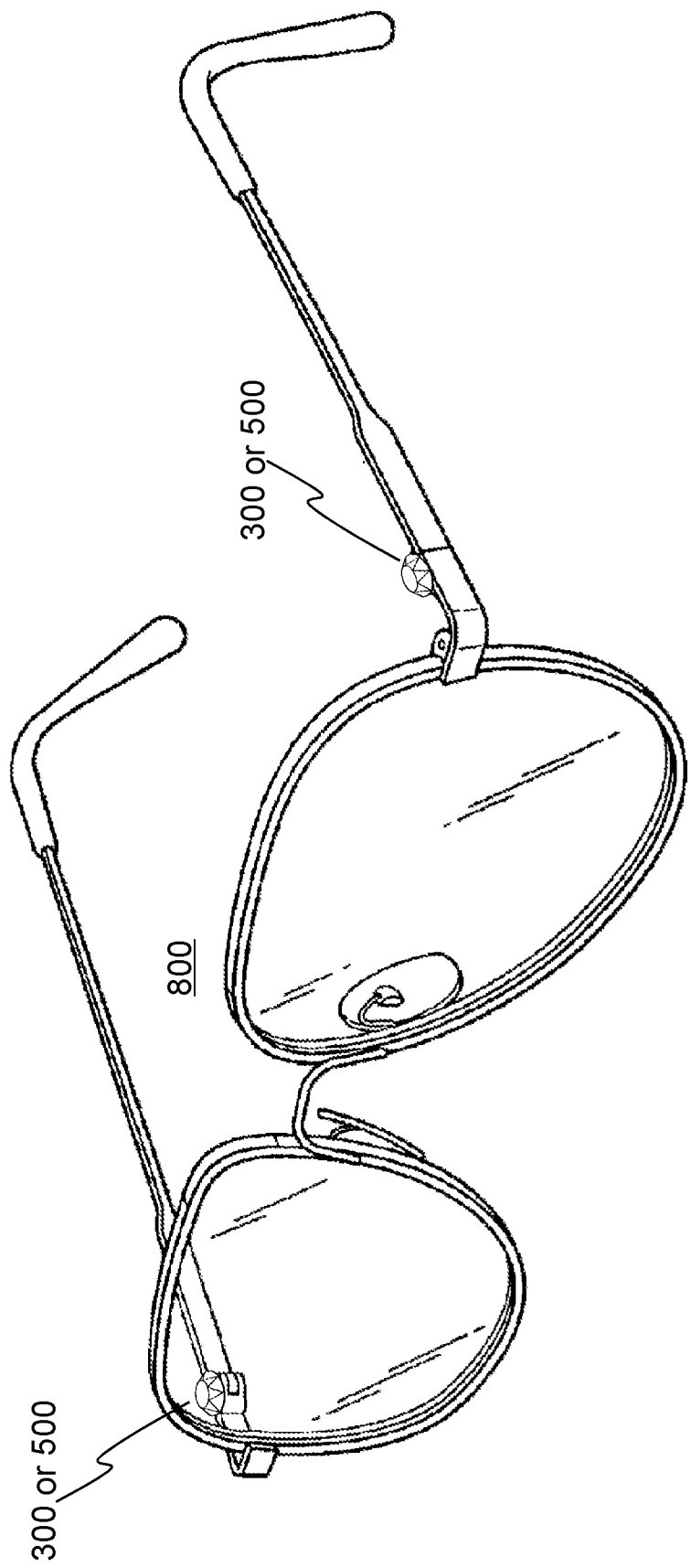
FIG. 8 sets forth a third phase in a manner of use of an example embodiment of the present invention.

In this illustration, the usefulness and function of the shoulder 104 is visible, whereas the top of the hinge 602 is located below the top edge of the temple. Without a shoulder or spacer 104, this space 702 would allow a portion of the jewel or ornament to be seated below the top edge of the temple, obscured from view on the other side of the temple. Therefore, in these particular applications, a shoulder 104 is provided in order to raise the bottom of the jewel or ornament such that it is entirely visible above the top edge of the temple, as shown in the fully-installed configuration 800 of FIG. 8. In some other embodiments and applications, the shoulder 104 may be provided by a separate, annular ring spacer which is slid over the threaded shank portion of the attachment device.

To remove the ornament or jewel attachment, the process is essentially reversed by inserting the thin bit of the drive tool into the bottom of the hinge to engage the assembly, then rotating the assembly clockwise (which is the reverse of normal screw removal) which would cause the threaded shank portion to move up and out of the hinge hole until completely removed from the hinge.

In at least one embodiment, a height of the threaded shank portion is 4.5 mm, the outer diameter of the crown is 5 mm, and inner diameter of the optional recess formed in the crown is 4.7 mm, the depth of the recess formed in the crown is 0.3 mm with the total height of the crown being about 2 mm. The threaded shank, in at least one embodiment, is provided with an M1.4 thread, and the drive tool receiver is a slot formed in the bottom of the threaded shank is 0.5 mm wide and 0.5 mm deep. The crown, optional shoulder and threaded shank portions may be produced using any suitable non-toxic material of sufficient strength such as, but not limited to, metal (e.g., stainless steel, silver and gold. etc.) and plastic (e.g., nylon, etc.).

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device for attaching a jewel or ornament to a hinge of a pair of eyeglasses, wherein the hinge comprises at least one threaded hole for receiving a threaded hinge pin, the device comprising:
   a threaded shank portion having a top end, a thread formed around a periphery, and a bottom end;
   a crown portion disposed at the top end of the threaded shank portion, the crown portion being free of any feature to receive a drive tool; and
   a drive tool receiver disposed at the bottom end of the threaded shank portion.

2. The device as set forth in claim 1 wherein the crown portion comprises a top planar surface juxtaposed to the threaded shank portion.

3. The device as set forth in claim 1 wherein the crown portion comprises a recess in a top surface juxtaposed to the threaded shank portion.

4. The device as set forth in claim 1 further comprising a decorative item affixed to the crown portion.

5. The device as set forth in claim 4 wherein the decorative item comprises a jewel.

6. The device as set forth in claim 4 wherein the decorative item comprises at least one item selected from the group consisting of an ornament and a bauble.

7. The device as set forth in claim 4 wherein the crown portion comprises a recess in a top surface juxtaposed to the threaded shank portion and wherein the decorative item comprises a boss received into the recess.

8. The device as set forth in claim 1 further comprising a shoulder spacer disposed between the top end of the threaded shank portion and a bottom of the crown.

9. The device as set forth in claim 8 wherein two or more of the shank, crown drive tool receiver and the optional shoulder spacer are integrally formed from a unitary portion of material.

10. The device as set forth in claim 1 wherein the drive tool receiver comprises one or more of the structures consisting of a recessed slot, a recessed crosspoint, a recessed hex, and a recessed star.

11. A method of manufacture of device for attaching a jewel or ornament to a hinge of a pair of eyeglasses, wherein the hinge comprises at least one threaded hole for receiving a threaded hinge pin, the method comprising:
    forming a thread around a periphery of a shank portion having a top end and a bottom end;
    disposing a crown portion at the top end of the threaded shank portion, the crown portion being free of any feature to receive a drive tool; and
    providing a drive tool receiver at the bottom end of the threaded shank portion.

12. The method as set forth in claim 11 wherein the disposing of the crown portion comprises disposing a top planar surface juxtaposed to the threaded shank portion.

13. The method as set forth in claim 11 wherein the disposing of the crown portion comprises disposing a recess in a top surface juxtaposed to the threaded shank portion.

14. The method as set forth in claim 11 further comprising affixing a decorative item to the crown portion.

15. The method as set forth in claim 14 wherein the decorative item comprises a jewel.

16. The method as set forth in claim 14 wherein the decorative item comprises at least one item selected from the group consisting of an ornament and a bauble.

17. The method as set forth in claim 14 wherein the disposing of the crown portion comprises disposing a recess in a top surface juxtaposed to the threaded shank portion and wherein the decorative item comprises a boss received into the recess.

18. The method as set forth in claim 11 further comprising disposing a shoulder spacer between the top end of the threaded shank portion and a bottom of the crown.

19. The method as set forth in claim 11 wherein the forming, disposing and providing are performed on a single portion of material to yield a device having at least two integral components.

20. The method as set forth in claim 11 wherein the drive tool receiver comprises one or more of the structures consisting of a recessed slot, a recessed crosspoint, a recessed hex, and a recessed star.

* * * * *